(12) United States Patent
Meng et al.

(10) Patent No.: US 10,554,040 B2
(45) Date of Patent: Feb. 4, 2020

(54) RESISTOR AND FUSE OVERCURRENT PROTECTION DEVICE

(71) Applicant: Lenovo Enterprise Solutions (Singapore) Pte. Ltd., Singapore (SG)

(72) Inventors: Jian Meng, Kanata (CA); Christian Savard, Gatineau (CA); Alexander Philip Campbell, Barrie (CA); Donald Richard Dignam, Sittsville (CA); Eric Rong Ao, Ottawa (CA); Georges P. Turcotte, Ottawa (CA); Stephen John Flint, Kanata (CA)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1037 days.

(21) Appl. No.: 14/657,087

(22) Filed: Mar. 13, 2015

(65) Prior Publication Data

US 2016/0268795 A1    Sep. 15, 2016

(51) Int. Cl.
*H02H 9/02* (2006.01)

(52) U.S. Cl.
CPC ................... *H02H 9/026* (2013.01)

(58) Field of Classification Search
CPC ......... H02H 3/025; H02H 9/004; H02H 9/026
USPC ....................................................... 361/93.8
See application file for complete search history.

(56) References Cited

U.S. PATENT DOCUMENTS

| | | | |
|---|---|---|---|
| 4,002,419 A * | 1/1977 | Hantack | F23N 5/146 431/67 |
| 4,680,527 A * | 7/1987 | Benenati | G01R 19/16542 320/112 |
| 4,869,975 A * | 9/1989 | Eppley | H02J 7/0031 429/122 |
| 5,218,307 A * | 6/1993 | Hiller | G01R 31/025 324/509 |
| 5,379,176 A * | 1/1995 | Bacon | G01R 1/36 361/106 |
| 5,621,602 A * | 4/1997 | Winkelmann | H01H 85/048 337/184 |
| 5,894,397 A * | 4/1999 | Nelson | H02H 3/046 361/104 |
| 6,404,017 B1 | 6/2002 | Takizawa et al. | |
| 7,253,496 B2 | 8/2007 | Jenne et al. | |
| 7,495,310 B2 | 2/2009 | Douzaka et al. | |
| 7,638,840 B2 | 12/2009 | Ohsawa | |
| 8,076,751 B2 | 12/2011 | Whitney | |

(Continued)

FOREIGN PATENT DOCUMENTS

| | | |
|---|---|---|
| JP | 2009081166 A | 4/2009 |
| JP | 5225643 B2 | 7/2013 |
| JP | 2014007134 A | 1/2014 |

OTHER PUBLICATIONS

Vishay "Power Metal Strip Resistors".*

(Continued)

*Primary Examiner* — Kevin J Comber

(57) ABSTRACT

A device, according to one embodiment, includes a fuse, and a resistor electrically coupled directly to the fuse in series therewith. A hybrid device, according to another embodiment, includes a fuse, and a resistor electrically coupled directly to the fuse in series therewith in a single package. A resistance of the resistor is 1 ohm or less, and is substantially temperature insensitive.

19 Claims, 6 Drawing Sheets

(56) References Cited

U.S. PATENT DOCUMENTS

| | | | | |
|---|---|---|---|---|
| 2006/0126255 A1* | 6/2006 | Slater | ............... | H02H 9/042 |
| | | | | 361/118 |
| 2006/0151618 A1 | 7/2006 | Kwon | | |
| 2009/0184797 A1* | 7/2009 | Hartzog | ............ | H01H 85/0241 |
| | | | | 337/187 |
| 2009/0261451 A1* | 10/2009 | Whitney | ............ | H01H 85/0241 |
| | | | | 257/530 |
| 2011/0188165 A1* | 8/2011 | El Filali | ................ | H01C 7/13 |
| | | | | 361/93.9 |
| 2014/0350773 A1* | 11/2014 | Smith | ................ | G07C 5/085 |
| | | | | 701/29.1 |
| 2015/0249332 A1* | 9/2015 | Kang | ................ | H02H 9/044 |
| | | | | 361/91.1 |

OTHER PUBLICATIONS

Sunmicrosystems, "Removing and Replacing Hot-Swappable Components," Sun Microsystems Inc., Netra 440 Server Sevice Manual, Chapter 3, 2006, 17 pages, retrived from https://docs.oracle.com/cd/E19102-01/n440.srvr/817-3883-12/hot-swap-frus.html.

Wikipedia, "Hot swapping," Wikipedia, Mar. 15, 2019, pp. 1-6, retrieved from https://en.wikipedia.org/wiki/Hot_swapping.

Rouse et al., "hot swap," TechTarget, Apr. 2005, pp. 1-4, retrieved from https://whatis.techtarget.com/definition/hot-swap.

Resistorguide, "Variable resistor," Resistor Guide, retrieved on Apr. 22, 2019 from http://www.resistorguide.com/variable-resistor/, 2 pages.

Resistorguide, "Thermistor," Resistor Guide, retrieved on Apr. 22, 2019 from http://www.resistorguide.com/thermistor/, 2 pages.

\* cited by examiner

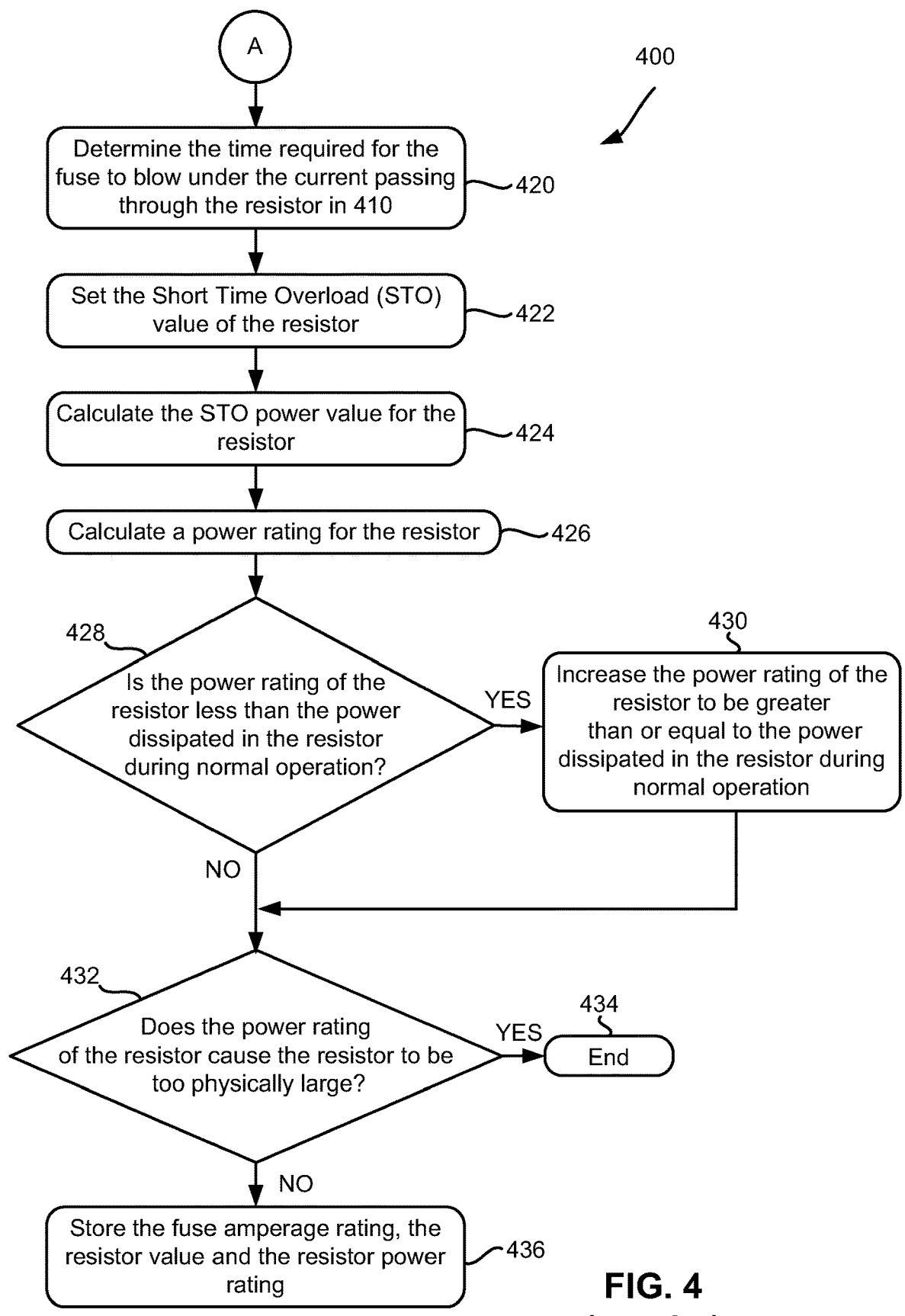
FIG. 4 (contin.)

500

| 2A fuse working in different current in normal condition |||| 
|---|---|---|---|
| Current in normal condition (A in rms) | Value of serial resitor (ohm) | Power rating of resistor (W) | Voltage drop (V) |
| 1.5 | 0.1 | 0.225 | 0.15 |
| 1.5 | 0.2 | 0.450 | 0.30 |
| 1.0 | 0.1 | 0.100 | 0.10 |
| 1.0 | 0.2 | 0.200 | 0.20 |
| 1.0 | 0.3 | 0.300 | 0.30 |
| 0.5 | 0.3 | 0.075 | 0.15 |
| 0.5 | 0.5 | 0.125 | 0.25 |
| 0.5 | 0.6 | 0.150 | 0.30 |
| 0.3 | 1.0 | 0.090 | 0.30 |

RESISTOR AND FUSE OVERCURRENT PROTECTION DEVICE

FIELD OF THE INVENTION

The present invention relates to electrical circuits, and more particularly, this invention relates to overcurrent protection in electrical circuits.

BACKGROUND

In electronics and circuitry, an overcurrent event typically occurs when a large electric current passes through a circuit component, e.g., a capacitor, a resistor, etc., that may not be rated to handle such a large current for a certain period of time.

In response to an overcurrent event, one or more circuit components such as a fuse or circuit breaker that are not rated to remain functional under such a large current typically create an open circuit.

In order to provide overcurrent protection for the load and/or source circuit components, one or more fuses have been implemented to serve as overcurrent sacrificial devices. Conventional fuses have very small serial resistance, causing there to be a very large pass-through current before the fuse blows upon occurrence of a short. This could cause some unwanted effect.

SUMMARY

A device, according to one embodiment, includes a fuse, and a resistor electrically coupled directly to the fuse in series therewith.

A hybrid device, according to another embodiment, includes a fuse, and a resistor electrically coupled directly to the fuse in series therewith in a single package. A resistance of the resistor is 1 ohm or less, and is substantially temperature insensitive.

A method for selecting values of a fuse and resistor electrically coupled directly to the fuse in series therewith in a hybrid device, according to yet another embodiment, includes determining a maximum current used by circuitry to be protected by the hybrid device during normal operation, determining a maximum desired voltage drop across the hybrid device during normal operation, selecting a fuse ampere rating, determining a maximum resistor value based on the maximum current and the maximum desired voltage drop, determining a level of current passable through the resistor based on the maximum resistor value, determining an amount of time for the fuse to blow at the level of current passable through the resistor, setting a short time overload value of the resistor to a multiple of the amount of time determined for the fuse to blow, calculating a short time overload power value for the resistor based on the set short time overload, calculating a power rating for the resistor based on the short time overload power value for the resistor, determining whether a size of the resistor is physically acceptable, and storing the fuse ampere rating, the maximum resistor value, and the resistor power rating.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 5 is a fuse specification table in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of overcurrent protection circuits and devices, and/or related systems and methods.

In one general embodiment, a device includes a fuse, and a resistor electrically coupled directly to the fuse in series therewith.

In another general embodiment, a hybrid device includes a fuse, and a resistor electrically coupled directly to the fuse in series therewith in a single package. A resistance of the resistor is 1 ohm or less, and is substantially temperature insensitive.

In yet another general embodiment, a method for selecting values of a fuse and resistor electrically coupled directly to the fuse in series therewith in a hybrid device includes determining a maximum current used by circuitry to be protected by the hybrid device during normal operation, determining a maximum desired voltage drop across the hybrid device during normal operation, selecting a fuse ampere rating, determining a maximum resistor value based on the maximum current and the maximum desired voltage drop, determining a level of current passable through the resistor based on the maximum resistor value, determining an amount of time for the fuse to blow at the level of current passable through the resistor, setting a short time overload value of the resistor to a multiple of the amount of time determined for the fuse to blow, calculating a short time overload power value for the resistor based on the set short time overload, calculating a power rating for the resistor based on the short time overload power value for the resistor, determining whether a size of the resistor is physically acceptable, and storing the fuse ampere rating, the maximum resistor value, and the resistor power rating.

Based on Ohm's law (current=voltage/resistance), the electrical current between two points in a circuit is directly proportional to the potential difference across the two points.

Various embodiments described herein provide overcurrent protection on the load and/or the source portion of a circuit via a serial coupling of a fuse and a resistor.

Figure 1:
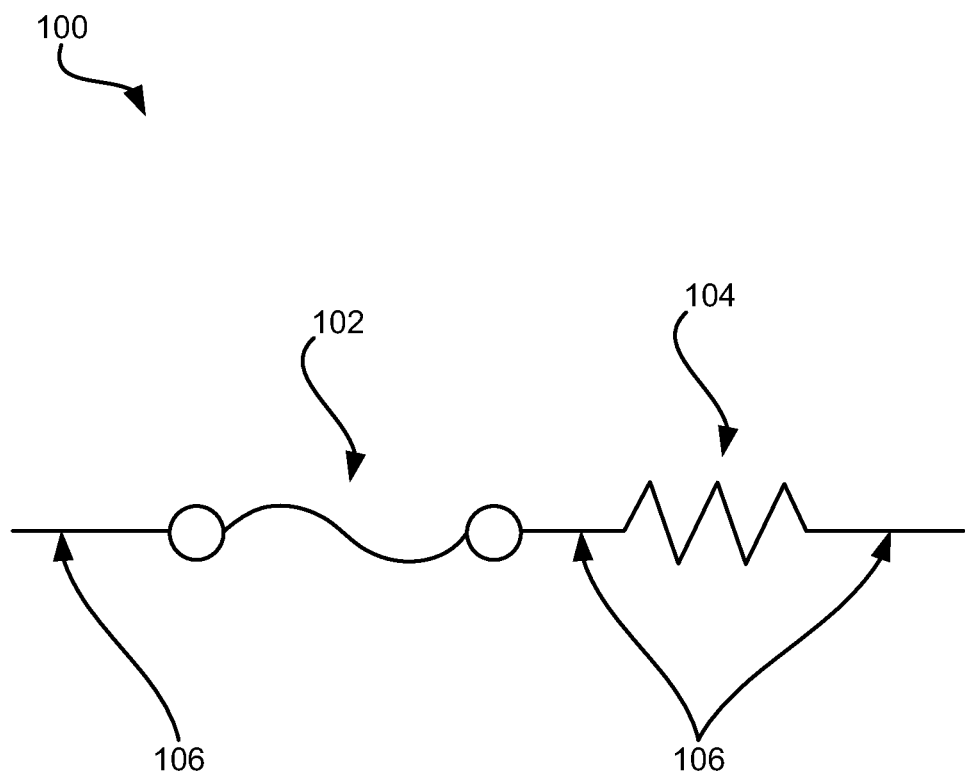
FIG. 1 is a serial connected fuse and resistor device in accordance with one embodiment.

FIG. 1 depicts a device 100 for overcurrent protection, in accordance with one embodiment. As an option, the present device 100 may be implemented in conjunction with features from any other embodiment listed herein, such as those described with reference to the other FIGS. Of course, however, such device 100 and others presented herein may be used in various applications and/or in permutations which may or may not be specifically described in the illustrative embodiments listed herein. Further, the device 100 presented herein may be used in any desired environment.

Referring now to FIG. 100, device 100 includes a fuse 102. The fuse 102 may be of any suitable type depending on the embodiment, e.g., a fast acting fuse, a glass tube type fuse, a fuse of a type known in the art, etc.

Device 100 additionally includes a resistor 104 electrically coupled (e.g. electrically coupled via wire 106, etc.) directly to the fuse 102 in series therewith. The resistor 104 may be of any suitable type depending on the embodiment, e.g., a carbon composite resistor, a film resistor, a resistor of a type known in the art, etc.

As illustrated by device 100, the resistor 104 may be positioned after the fuse 102 in an intended direction of current flow therethrough, e.g., from the left to right direction in FIG. 1. In other embodiments, the resistor 104 may be positioned before the fuse 102 in an intended direction of current flow therethrough, e.g., from the right to left direction in FIG. 1. Note that the intended direction of current flow is generally discernable as flowing from the current source to the circuit to be protected by the device 100. In yet other embodiments, resistors may be positioned on both sides of the fuse.

The conductive path of the device 100 may include the fuse 102 and the resistor 104. Furthermore, each of the fuse 102 and the resistor 104 may have leads/connectors of nominal resistance for enabling coupling to external system(s) such as a current source and a circuit to be protected. For example, in embodiments described herein, the circuit to be protected may be the load portion of the circuit to which the leads/connectors of the fuse and/or resistor is coupled to.

Placing the resistor 104 with a fuse 102 in a series electrical connection, thereby forming a "hybrid device," may be advantageous because the resistor 104 contributes a resistance which limits the amount of current that passes through, e.g., the fuse 102, the load portion of the circuit, the source portion of the circuit, etc.

Limiting the amount of current that passes through a fuse for example may substantially reduce the probability of the fuse blowing (as described above). Additionally, limiting the amount of current that passes through a fuse in a circuit may improve the overcurrent protection on the load portion and/or the source portion of the circuit e.g. by limiting the voltage excursion that the load portion and/or the source portion may experience.

Limiting the amount of current that passes through a fuse in a circuit may additionally limit the maximum current passed through hot plug units, e.g., a unit that may be connected/mated to a load and afterwards disconnected from the load and/or power unit, a hot plug unit of a type known in the art, etc. Limiting the amount of current that passes through a fuse in a circuit may advantageously enable the circuit to act as a slow start circuit in response to the circuit initially powering up.

The power dissipation of the resistor 104 may be sufficiently high to ensure that the fuse will open, e.g. blow, before the resistor 104 becomes overloaded. Allowing for the fuse to open before the resistor 104 becomes overloaded may be important for a number of reasons. For example, the resistor blowing may cause a smoke issue in the circuit which the hybrid device is implemented in. In another example, the fuse 102 of the circuit where the resistor 104 and fuse 102 are configured may be easier to replace than the resistor 104, e.g., a hot swap fuse. Additionally, the fuse 102 may be less expensive and/or cheaper to have replaced than the resistor 104.

Device 100 and/or other devices described herein may be configured for direct current application. According to other embodiments, device 100 and or other devices described herein may be configured for alternating current application.

Figure 2:
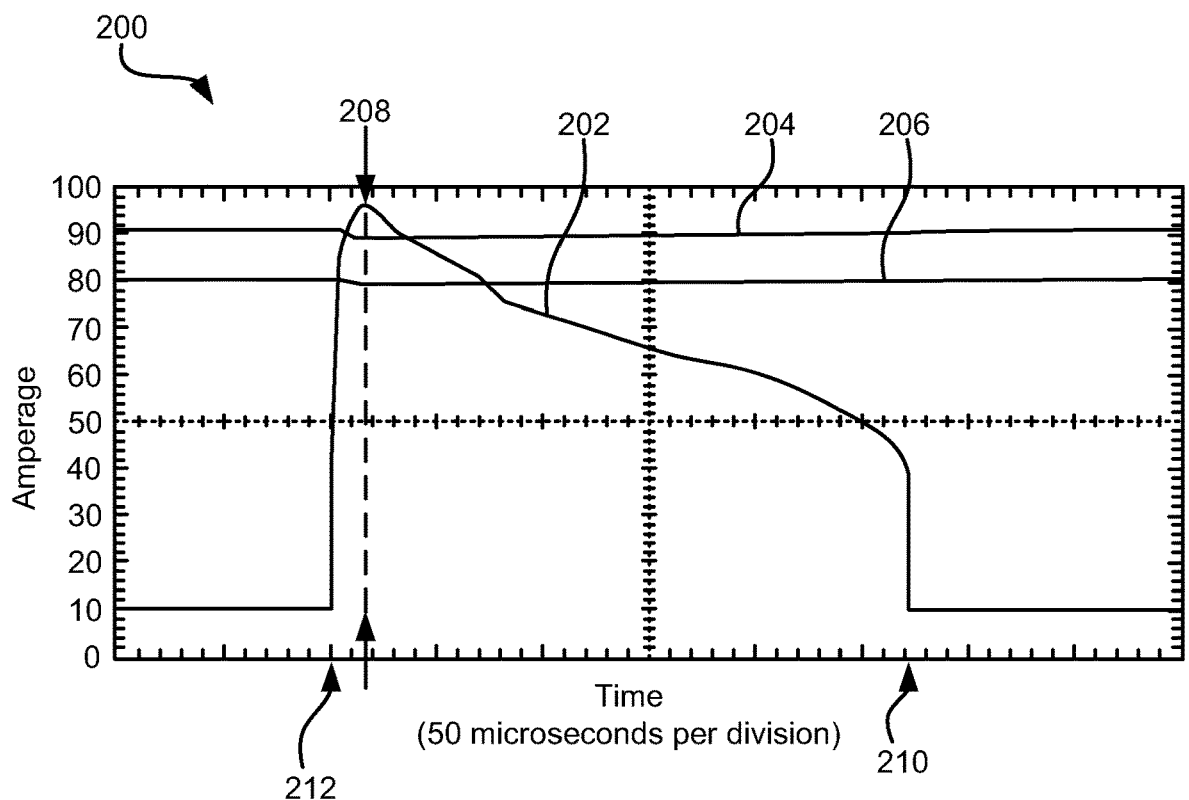
FIG. 2 is a behavioral current and variable voltages vs time plot in accordance with a comparative example.

An illustrative example of the disadvantages/dangers that exist when applying an unrestricted voltage and current to a fuse in a circuit are illustrated by FIG. 2.

FIG. 2 depicts a plot 200, in accordance with a comparative example. Particularly, plot 200 of FIG. 2 is a behavioral current and variable voltages (y-axis of plot 200) vs time (x-axis of plot 200) plot. It should be noted plot 200 and the values of plot 200 described herein should be interpreted to be an example and for illustrative purposes.

Plot 200 includes behavioral current 202, which illustrates the behavior of current while passing through a 2 A fuse that is not electrically coupled directly to a resistor. It should be noted that the −50 A to 50 A y-axis numerical legend is displayed in plot 200 as a numerical amperage reference and should not be referenced as a numerical voltage reference. It should be noted that the voltages of FIG. 2 are DC voltages.

Plot 200 further includes a first applied voltage 204 of 12.36 V and a second applied voltage 206 of 11.64 V. In plot 200 the first applied voltage 204 is applied to the fuse at a first time 212. Sometime afterwards, a peak to peak current 208 of 86 A is illustrated passing through the fuse. After the first applied voltage 204 is dropped to a second applied voltage 206, the fuse opens, e.g., blows, at a second time 210. The first applied voltage 204 may be dropped to a second applied voltage 206 once components of a circuit receive current, e.g., after current draws have occurred (which may occur in response a current being initially applied to a circuit), etc.

The illustrative fuse in plot 200 may blow at second time 210 because the fuse is not rated to remain functional with such a large applied current. The fuse of illustrative fuse in plot 200 may represent typical fuses which by design typically have a low nominal resistance. As described above, the maximum current that may pass through typical fuses with a low nominal resistance may not be very high in many conditions, regardless of the ampere rating of the fuse.

Because the fuse does not have a resistor electrically coupled directly to the fuse in series therewith, the peak to peak current 208 that passes through the fuse is unrestricted, e.g., there is no overcurrent protection provided to the fuse, the majority of the current may pass through the fuse, the fuse may be significantly stressed due to the application of a large current on the fuse with a lower than applied ampere rating, etc. The large application of current, e.g., the peak to peak current 208, etc., may occur due to the device which the fuse is coupled to turning on and thereby causing the current to surge/spike.

Overcurrent protection may be provided to a portion of a circuit, e.g., the fuse, the load portion of the circuit, the source portion of the circuit, etc., by placing a resistor in serial electrical connection with a fuse.

Figure 3:
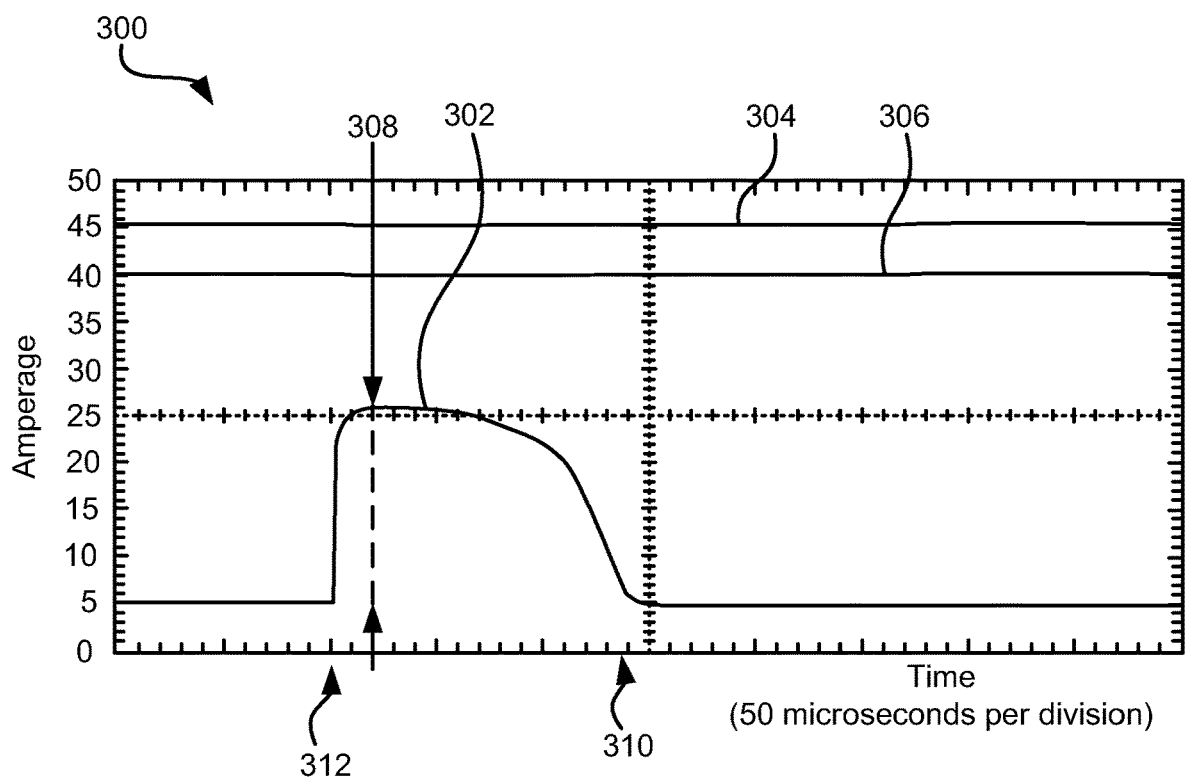
FIG. 3 is a behavioral current and variable voltages vs time plot in accordance with one embodiment.

FIG. 3 depicts a plot 300 with overcurrent protection, in accordance with one embodiment. As an option, the present plot 300 may be implemented in conjunction with features from any other embodiment listed herein, such as those described with reference to the other FIGS. Of course, however, such plot 300 and others presented herein may be used in various applications and/or in permutations which may or may not be specifically described in the illustrative embodiments listed herein. Further, the plot 300 presented herein may be used in any desired environment.

Plot 300 of FIG. 3 is a behavioral current and variable voltages (y-axis of plot 300) vs time (x-axis of plot 300) plot in accordance with one embodiment. It should be noted plot 300 and the values of plot 300 described herein should be interpreted to be an example and for illustrative purposes only. Furthermore, characteristics of circuitry components, e.g., the resistive values of resistors, the selected fuse type, applied voltages, etc., of embodiments described herein may vary.

Plot 300 includes behavior current 302, which illustrates the behavior of current when passing through a 2 A fuse that has a resistor electrically coupled directly to the fuse in series therewith. For purposes of an example, a 0.44 Ω resistor is included in the calculations and plotting of FIG. 3. One may expect a similar result from fuses having a nominal resistance.

Plot 300 additionally includes a first applied voltage 304 and a second applied voltage 306. In plot 300 the first applied voltage 304 of 12.36 V is applied to the fuse and the resistor at a first time 312. Sometime afterwards, a peak to peak current 308 of 21.4 A is illustrated passing through the fuse and the resistor. This measured peak to peak current 308 of 21.4 A does not short the fuse of plot 300, because the peak to peak current 308 is within the theoretical maximum short current which for a 12 V voltage source and 0.44 Ω resistor would be 27 A. This may be due to the added resistor limiting the current from 86 A to 21.4 A. As described above, the maximum current that may pass through typical fuses with a low nominal resistance may not very high in many conditions, regardless of the ampere rating of the fuse. Limiting the current applied to the fuse from 86 A to 21.4 A provides overcurrent protection to the fuse and or other portions of the circuit that might otherwise be damaged due to overcurrent events.

It should be noted that the voltages of FIG. 3 are DC voltages. It should further be noted that the theoretical maximum short current and the measured peak to peak current 308 may differ in value due to, e.g., resistor tolerance, wire resistance between the resistor and fuse, etc.

An additional advantage, e.g., as shown in FIG. 3, that may result from electrically coupling a resistor and fuse in series in a device, is the limiting of current surging throughout the device that may occur in response to the device being turned on. This advantage is illustrated in FIG. 3, as the peak to peak current 308 lacks the current surge/spike, e.g., upon turning on the device, etc., as illustrated in FIG. 2 at the peak to peak current 208.

After the first applied voltage 304 is dropped to a second applied voltage 306 of 12 V (e.g. a lower voltage in this example), the current is limited by the resistor at a second time 310 and unlike in FIG. 2, in FIG. 3 the fuse, circuit, resistor, etc. remain functional due to the resistor providing overcurrent protection to the fuse and/or the other portions of the circuit, etc. The first applied voltage 304 may be dropped to a second applied voltage 306 once components of a circuit receive current, e.g., after current draws have occurred (which may occur in response a current being initially applied to a circuit), etc.

In order to establish overcurrent protection for a fuse and/or for a circuit, e.g., fuse 102 of FIG. 1, etc., the parameters and or functional design of the resistor are important. The resistance of the resistor (e.g., resistor 104 of device 100, the resistor who's behavior is illustrated by FIG. 3, resistors of some and/or all embodiments described herein, etc.) may be 1 ohm or less, e.g., 1 ohm, 0.9 ohms or less, 0.8 or less, 0.5 ohm or less, 0.25 ohms or less, etc. but high enough to provide overcurrent protection in the application for which designed, i.e., higher than a nominal resistance, e.g., the resistance of the leads 106.

The resistance value of the resistor may be selected depending on the expected applied current. Moreover, variable resistance resistors may be used.

According to various embodiments, the resistance of the resistor may be substantially temperature insensitive. For example, cold sensitive resistors may initially, e.g., when an initial voltage is applied to them, etc., have a low resistance, which limits the current. A resistance that is not temperature sensitive and/or less temperature sensitive may provide the advantage of not limit the current, e.g., when an initial voltage is applied to them, etc.

Additionally, the resistance of the resistor 104 may be substantially temperature insensitive, e.g., changes by less than 1% across the entire temperature range in which the hybrid device may be used and/or which the hybrid device may experience due to joule heating. In preferred embodiments, the resistance of the resistor may be not temperature sensitive, i.e., any change in resistance may be negligible, e.g., less than 0.1% across the possible temperature range.

Figure 4:
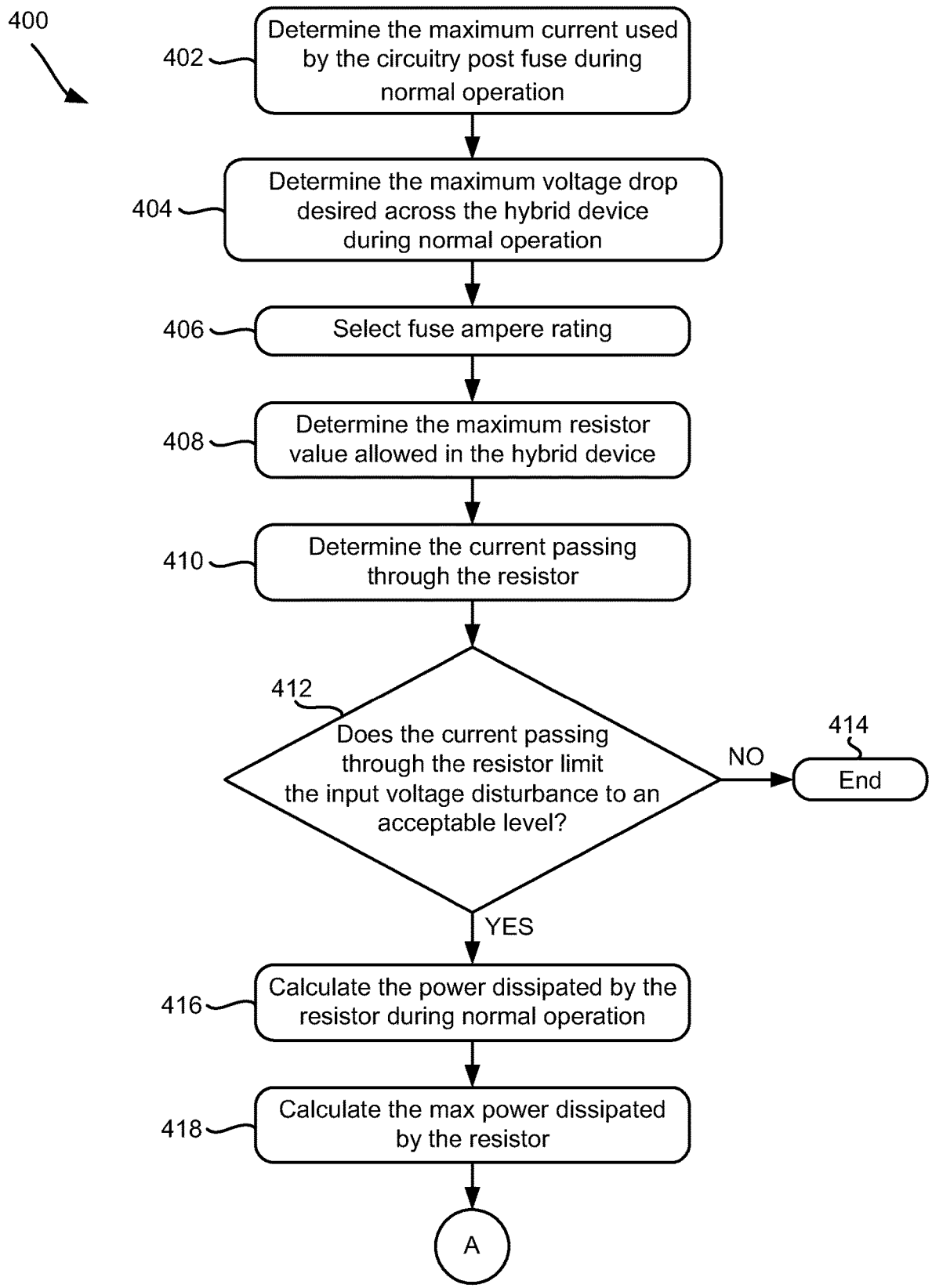
FIG. 4 is a flowchart of a process in accordance with one embodiment.

A preferred method of selecting fuse and/or resistor parameters for placement in an overcurrent protection configuration, e.g., as depicted by the configuration of device 100, etc., is detailed by FIG. 4.

FIG. 4 shows a method 400 for fuse and/or resistor selection, in accordance with one embodiment. As an option, the present method 400 may be implemented to overcurrent protection circuit configurations such as those shown in the other FIG. 1. Of course, however, this method 400 and others presented herein may be used to [select circuit components for a wide variety of devices and/or purposes, e.g., such as current limiting devices, circuit filters, etc. which may or may not be related to the illustrative embodiments listed herein. Further, the methods presented herein may be carried out in any desired environment. Moreover, more or less operations than those shown in FIG. 4 may be included in various embodiments. It should also be noted that any of the aforementioned features may be used in any of the embodiments described in accordance with the various methods.

Referring now to method 400, in operation 402, the maximum current used by the circuitry post fuse during normal operation (herein may be referred to as "$I_{max}$") is determined. Determining the maximum current used by the circuitry post fuse during normal operation may be determined based on the circuitry design, and/or performed using a current calculation process, e.g., using an ammeter, using a voltmeter and/or ohms law, calculating $I_{max}$ using a process of a type known in the art, etc.

In operation 404, the maximum voltage drop (herein may be referred to as "$V_{max}$") desired across the hybrid device, e.g., the fuse and the resistor electrically coupled directly to the fuse in series therewith, etc., during normal operation is determined. Determining $V_{max}$ desired across the hybrid device during normal operation may be important in order to set safe functional voltage drops that correspond to the operational limits of the hybrid device components, as well as ensuring that the voltage supplied to the circuitry post fuse is at a sufficient level for such circuitry.

According to one embodiment, $V_{max}$ may be determined based on the total resistance of the circuit that the hybrid device is a component of. In further embodiments, the maximum voltage drop desired across the hybrid device may be determined by another method, e.g., by a user preference, by an algorithm, by comparator logic, etc.

With an exemplary source voltage of 12 V and a specification of the circuitry post fuse allowing a 5% tolerance of the source voltage, the maximum voltage drop is 0.6V across the resistor, assuming nominal resistance of the fuse. The minimum voltage after the resistor is then 11.7 V. If 11.7 V falls within the preferred operating conditions, which in this example is within a, then a voltage drop across the load circuit, $V_{max}$ of 0.3 V is acceptable.

With continued reference to method 400, in operation 406 the fuse ampere rating is selected. The fuse ampere rating may be selected based on one or more parameters, e.g., the determined $I_{max}$ of operation 402, derating rules of the circuit (e.g. current rules of the circuit, voltage rules of the circuit, power rules of the circuit, etc.), etc. Generally, the fuse ampere rating should be selected to provide appropriate overcurrent protection to the circuitry post fuse.

In operation 408, the maximum resistor value (herein may be referred to as "$R_{max}$") allowed in the hybrid device is determined. According to one embodiment, the maximum resistor value may be preferably determined using the following equation (Ohm's law):

$$R_{max}=V_{max}/I_{max} \qquad \text{Equation (1)}$$

The determined maximum resistor value may be used to determine the amount of current limiting that the resistor contributes to the circuit, as will be described below.

It should be noted that the circuit parameter descriptions herein, e.g., maximum, minimum, nominal, etc. may describe parameters with respect to various perspectives, e.g., a user, component design, set safety guidelines, etc. and accordingly should be interpreted as broadly as possible.

In one example, assume a 2 A fuse was selected in operation 406 and a current of 1 A is used in normal operation conditions. A 0.3 O resistor may be considered for pairing with the 2 A fuse, e.g., in a serial connection, etc., to provide overcurrent protection on the load and/or the source circuit. The maximum voltage drop across the resistor is calculated to be 0.3 V by multiplying the system current during normal operation conditions and the resistance of the resistor, e.g., 1 A*0.3 O (e.g. using Ohm's law in the present example), etc.

With an exemplary source voltage of 12 V and a voltage drop of 0.3 V across the resistor, the minimum voltage after the resistor is then 11.7 V. This value of 11.7 V falls within the preferred operating conditions, which in this example is within the 5% tolerance of the source voltage.

In operation 410, the current (herein may be referred to as "$I_s$") passing through the resistor is determined. According to various embodiments, the current passing through the resistor is preferably determined as if the output of the resistor is shorted to ground. $I_s$ may be preferably calculated using the following equation:

$$I_s=I_{IN}/R_{max} \qquad \text{Equation (2)}$$

In Equation (2), variable "$I_{IN}$" represents the hybrid device input voltage.

With $I_s$ calculated, it may be determined if the selected fuse and/or resistor values, e.g., the fuse ampere rating selected in operation 406, the resistor value determined in operation 408, etc. are sufficient, e.g., for placement in the hybrid device, for providing overcurrent protection in the circuit which they are implemented in, for the operating conditions of the hybrid device, etc.

In determination 412, it is determined if the current passing through the resistor limits the input voltage disturbance, e.g., voltage spikes, voltage sags, voltage surges, etc., to an acceptable level. If the current passing through the resistor does not limit the input voltage disturbance to an acceptable level (as noted by the "NO" logic leading from determination 412), method 400 may end as noted in operation 414. Alternatively, in response to determining that the current passing through the resistor does not limit the input voltage disturbance to an acceptable level, further determinations and/or operations may be performed, e.g., the selection by method 400 of different selected fuse values and/or different selected resistor values, determining that no sufficient hybrid device exists under the circuit operating parameters, a different source of overcurrent protection may be sought, etc.

Similarly, decision 412 may determine if the level of current passable through the resistor limits an input voltage disturbance to within a predefined range, e.g., to an acceptable level, below a threshold, etc.

If the current passing through the resistor does limit the input voltage disturbance to an acceptable level (as noted by the "YES" logic leading from determination 412) further component parameters for the resistor and/or the fuse of the hybrid device may be determined, e.g., by further operations of method 400, etc.

In operation 416, the power (herein may be referred to as "$P_N$") dissipated by the resistor during normal operation is calculated using any known technique. By calculating the power dissipated by the resistor during normal operation, resistor parameters of the hybrid device may be correctly set, e.g., in a way that provides overcurrent protection on the load and/or the source circuit, etc., as will be detailed in further operations and embodiments of FIG. 4.

The power dissipated by the resistor during normal operation may be preferably calculated using the following equation:

$$P_N=I_{max}^2*R_{max} \qquad \text{Equation (3)}$$

In operation 418, the maximum power (herein may be referred to as "$P_s$") dissipated by the resistor is calculated using any known technique. In further embodiments, the maximum power dissipatable by the resistor may be calculated. $P_s$ may be preferably calculated under an assumption that the output of the resistor is shorted to ground. Shorting the output of the resistor to ground may provide a resistance that does not incorporate a resistance in the load portion of the circuit. In calculating the maximum power dissipated by the resistor while that the output of the resistor is shorted to ground, resistor parameters of the hybrid device may be correctly set, e.g., in a way that provides overcurrent protection on the load and/or the source circuit, etc.

$P_s$ may be preferably calculated using the following equation:

$$P_s = I_s^2 * R_{max} \quad \text{Equation (4)}$$

It should be noted that in calculations of embodiments described herein, e.g., when calculating $P_s$ in Equation (4), etc., the nominal resistance of the fuse and/or the nominal resistance of the leads and/or connectors of the fuse and/or resistor may be ignored, e.g., due to its very small contributing resistance proportion when compared to the resistor. In further embodiments, the resistance of the fuse may be calculated and/or added to the calculated maximum resistor value, e.g., when the nominal resistance minimally and/or substantially contributes to the maximum resistor value, when including the resistance of the fuse would change the logic outcome of determination 412, when extremely precise parameter calculations are required, etc.

In operation 420, the time (herein may be referred to as "$T_{Is}$") required for the fuse to blow under the current $I_s$ passing through the resistor as in operation 410 is determined. Determining the time required for the fuse to blow under the maximum current may be used in setting resistor parameters, e.g., in a way that provides overcurrent protection on the load and/or the source circuit, etc. Furthermore, $T_{Is}$ may be in part and/or fully determined based on the fuse design parameters, e.g., time vs. fuse current stress plots, fuse specification sheets, performing physical and/or simulated current stress testing on the fuse, etc.

In operation 422, the Short Time Overload (STO) value for $W_s$ (herein may be referred to as "$STO_{ws}$") of the resistor is set. Setting an STO value for the resistor may provide a resistor design parameter that may be used in calculating the power rating of the resistor. When calibrating a power rating for a resistor, accounting for high current resistor limits, e.g., short time overloads, unexpected current surges, etc. may provide a reliable resistor, e.g., one that is not likely to blow, one that provides overcurrent protection on a load portion and/or the source portion of a circuit, etc., when implemented in an appropriately matched circuit.

The STO value of the resistor may be preferably calculated using the following equation:

$$STO_{ws} = 4 * T_{Is} \quad \text{Equation (5)}$$

In variants of Equation (5), the $STO_{ws}$ is preferably at least four times the value of $T_{Is}$ to allow for fuse tolerances.

In operation 424, a STO power value (herein may be referred to as $P_{fs}$) of the resistor is calculated. Calculating $P_{fs}$ for the resistor may provide a resistor design parameter that may be used in calculating the power rating of the resistor. When calibrating a power rating for a resistor, accounting for high current resistor limits, e.g., short time overloads, unexpected current surges, etc. may provide a reliable resistor, e.g., one that is not likely to blow, one that provides overcurrent protection on a load portion and/or the source portion of a circuit, etc., when implemented in an appropriately matched circuit.

$P_{fs}$ may be preferably calculated using the following equation:

$$P_{fs} = (STO_{ws} * I_s)/5 \text{ s} \quad \text{Equation (6)}$$

In Equation (6), the numerical value "5 s" represents a STO value of five seconds.

In this example, the STO power value ($P_{fs}$) is five times the resistor power rating for an STO of five seconds. Accordingly, in operation 426, a power rating (herein may be referred to as $P_R$) for the resistor is calculated. $P_R$ may be preferably calculated for this example using the following equation:

$$P_R = P_{fs}/5 \quad \text{Equation (7)}$$

The power rating for the resistor may be used to calculate the conditions under which a fuse will blow. These conditions may be noted and implemented accordingly into the selecting of fuse and/or resistor parameters for placement in an overcurrent protection configuration of a hybrid device, e.g., as depicted by the configuration of device 100, etc., to ensure that the fuse will open, e.g., blow, before the resistor becomes overloaded.

An example of determining (e.g. based on the power rating of the resistor, etc.) the conditions under which a fuse will blow before the resistor becomes overloaded will be described below.

FIG. 5 depicts a fuse specification table 500, in accordance with one embodiment. As an option, the present fuse specification table 500 may be implemented in conjunction with features from any other embodiment listed herein, such as those described with reference to the other FIGS. Of course, however, such fuse specification table 500 and others presented herein may be used in various applications and/or in permutations which may or may not be specifically described in the illustrative embodiments listed herein. Further, the fuse specification table 500 presented herein may be used in any desired environment.

Referring now to FIG. 5, fuse specification table 500 includes various working condition scenarios of a 2 A fuse. For example, column 502 of fuse specification table 500 includes sequential current conditions which may pass through the fuse and/or resistor. Column 504 includes sequential serial resistor values, e.g., serial resistor of the hybrid device, etc. Additionally, fuse specification table 500 includes power ratings of the resistors in column 506. Furthermore, column 508 includes voltage drops that may be experienced across the resistor of the hybrid device.

The components having values illustrated in row 510 (e.g. a 0.5 Watt and a 0.5 O resistor) may be placed in a serial connection, e.g., for overcurrent purposes described herein, etc. Assuming a 12 V voltage source, and based on the selection of row 510 components, the maximum current may be calculated to be 24 A by dividing the source current by the value of the serial resistor, e.g., 12 V/0.5 O. The effects of five seconds of STO on the components may be calculated to be 2.5 Watts for 5 seconds of STO, by multiplying the time of applied STO by the power rating of the resistor, e.g., 5 seconds×0.5 Watts.

If the current is increased to 24 A, the power may be calculated to be 288 Watts by multiplying the square of the current with the rating of the resistor, e.g., 24 Watts*24 Watts*0.5 O. In the present example, the time of STO may then be estimated to be 43 milli-seconds by multiplying the five seconds of STO by the division of the effects of five seconds of STO on the components by the increased power, e.g., (2.5 Watts/288 Watts)×5 seconds.

According to these calculations, the 2 A fuse would then blow in ~2 mS, even with a 10 A current. These parameters/calculations may be used, e.g., stored, designed into circuitry, saved in a warning system, etc. to ensure that the fuse blows and/or limits the maximum current passing through the resistor and fuse to remain within 24 A in a short condition.

Referring again to method 400 of FIG. 4, in determination 428, it is determined if the power rating of the resistor ($P_R$) less is than the power dissipated in the resistor during normal operation ($P_N$).

If it is determined in determination 428 that the power rating of the resistor ($P_R$) is less than the power dissipated in the resistor during normal operation ($P_N$) (as noted by the "YES" logic leading from determination 428), the power rating of the resistor may be increased to be greater than or equal the power dissipated in the resistor during normal operation. See operation 430. Then the process continues to operation 432.

If it is determined in determination 428 that the power rating of the resistor ($P_R$) is greater than or equal to the power dissipated in the resistor during normal operation ($P_N$) (as noted by the "NO" logic leading from determination 428), the process continues to operation 432.

In determination 432, it is determined if the power rating of the resistor ($P_R$) causes the resistor to be too physically large. A resistor classification of being too physically large may vary depending on the embodiment. For example, a resistor may be determined to be too physically large, e.g., based on the size constrains of a circuit that the resistor is going to be implemented in, the target size of the hybrid device, the size of the resistor when compared to other circuit components, etc.

As illustrated in method 400, when it is determined that the power rating of the resistor causes the resistor to be too physically large (as noted by the "YES" logic leading from determination 432), method 400 may end as noted in operation 434. Alternatively, in response to determining that the power rating of the resistor causes the resistor to be too physically large, further determinations and/or operations may be performed, e.g., method 400 may be re-performed using different selected fuse values and/or different selected resistor values, it may be determined that no sufficient hybrid device exists under the circuit operating parameters, a different source of overcurrent protection may be sought, etc.

When it is determined that the power rating of the resistor does not cause the resistor to be too physically large (as noted by the "NO" logic leading from determination 432), one or more of the fuse amperage rating, the resistor value and/or the resistor power rating may be stored and/or set as the ratings and/or values of the fuse and resistor of the hybrid device, e.g., such as device 100 of FIG. 1. See operation 436.

Although the majority of embodiments described herein have been described as having a fuse and a resistor electrically coupled directly to the fuse in series therewith, according to one embodiment, the resistor may be a plurality of resistors coupled in parallel with one another. For example, as an alternative to having a fuse and a 0.44 O resistor electrically coupled directly to the fuse in series therewith, a fuse and five parallel connected 2.2 O resistors may be electrically coupled directly to the fuse in series therewith. The parallel connected five 2.2 O resistors would provide close to the same resistance as the single 0.44 O resistor.

Figure 6:
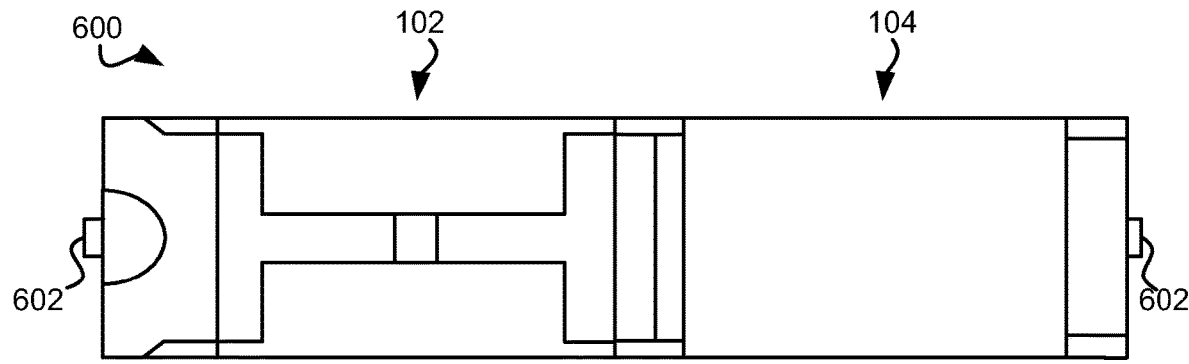
FIG. 6 is a top down view of a fuse and a resistor in a side by side configuration in accordance with one embodiment.

FIG. 6 depicts a fuse and resistor device configuration 600 in accordance with one embodiment. As an option, the present fuse and resistor device configuration 600 may be implemented in conjunction with features from any other embodiment listed herein, such as those described with reference to the other FIGS. Of course, however, such fuse and resistor device configuration 600 and others presented herein may be used in various applications and/or in permutations which may or may not be specifically described in the illustrative embodiments listed herein. Further, the fuse and resistor device configuration presented herein may be used in any desired environment.

Configuration 600 of FIG. 6 is a top down view of fuse 102 and resistor 104 in a side by side configuration in accordance with one embodiment. The fuse 102 and resistor 104 include electrical pads/leads 602, which may establish an electrical connection with circuitry, e.g., the hybrid device, a circuit layout in which configuration 600 is implemented in, etc. Furthermore, in configuration 600 the fuse 102 and resistor 104 are electrically coupled with one another.

According to various embodiments, configuration 600 may be implemented in a hybrid device which has height restrictions, e.g., where a stacked configuration would not fit, etc., but where the hybrid device also has sufficient area on the device for the fuse 102 and resistor 104 of configuration 600.

Figure 7:
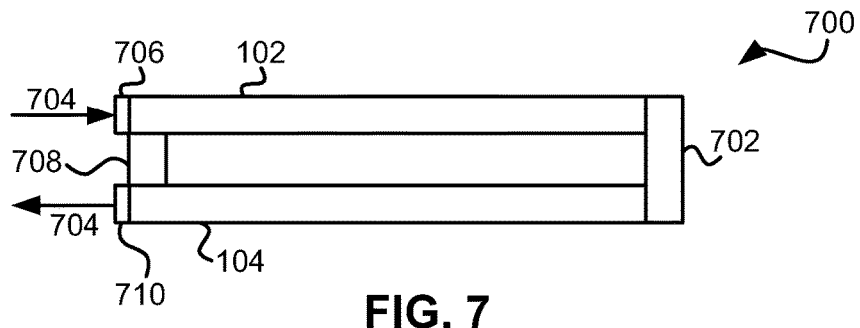
FIG. 7 is a side view of a fuse and resistor in a combined single package configuration in accordance with one embodiment.

FIG. 7 depicts a fuse and resistor device configuration 700 in accordance with another embodiment. As an option, the present fuse and resistor device configuration 700 may be implemented in conjunction with features from any other embodiment listed herein, such as those described with reference to the other FIGS. Of course, however, such fuse and resistor device configuration 700 and others presented herein may be used in various applications and/or in permutations which may or may not be specifically described in the illustrative embodiments listed herein. Further, the fuse and resistor device configuration presented herein may be used in any desired environment.

Configuration 700 of FIG. 7 is a side view of a fuse 102 and resistor 104 in a combined single package configuration in accordance with one embodiment. The fuse 102 and resistor 104 include electrical pads/leads 706, 710 to establish electrical connection with circuitry, e.g., the hybrid device, a circuit layout in which configuration 600 is implemented in, etc. An electrical current 704 is seen entering the fuse 102 via lead 706, and exiting the resistor 104 via lead 710. The current 704 may pass from the fuse 102 to the resistor 104 via a conductive path 702. Configuration 700 additionally includes electrical insulator 708 between the fuse 102 and resistor 104, which may ensure the current passes through the entire fuse 102 and/or resistor 104.

Furthermore, although in configuration 700, resistor 104 is positioned over fuse 102, in further embodiments, fuse 102 may alternatively be positioned over resistor 104.

Figure 8:
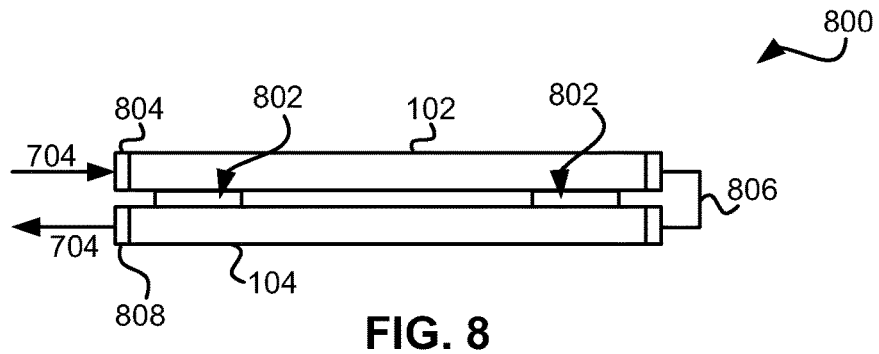
FIG. 8 is a side view of a fuse and resistor in a stacked configuration in accordance with one embodiment.

FIG. 8 depicts a fuse and resistor device configuration 800 in accordance with one embodiment. As an option, the present fuse and resistor device configuration 800 may be implemented in conjunction with features from any other embodiment listed herein, such as those described with reference to the other FIGS. Of course, however, such fuse and resistor device configuration 800 and others presented herein may be used in various applications and/or in permutations which may or may not be specifically described in the illustrative embodiments listed herein. Further, the fuse and resistor device configuration presented herein may be used in any desired environment.

Configuration 800 of FIG. 8 depicts a side view of a fuse 102 and resistor 104 in a preferred stacked configuration according to one embodiment. According to configuration 800 and/or various other embodiments, the fuse 102 and resistor 104 may be physically stacked one atop the other in a single package. Configuration 800 may further include electrical insulators 802 to provide some separation between the fuse 102 and resistor 104. Electrical current 704 is seen entering the fuse 102 via lead 804, and exiting the resistor 104 via lead 808. The current 704 may pass from the fuse 102 to the resistor via conductive path 806.

According to various embodiments, the fuse 102 and resistor 104 may be at least partially stacked above the center portions of one another, so that the fuse 102 and resistor 104 are about aligned. In further embodiments, the fuse 102 and resistor 104 may be stacked at least partially off center, so that the fuse and resistor are not aligned, e.g., in a hybrid device that has specific design parameters, in a hybrid device that requires access to the stacked fuse 102 and resistor 104 at all times, etc. Furthermore, although in configuration 800, resistor 104 is stacked on top of fuse 102, in further embodiments, fuse 102 may alternatively be stacked on top of resistor 104.

Figure 9:
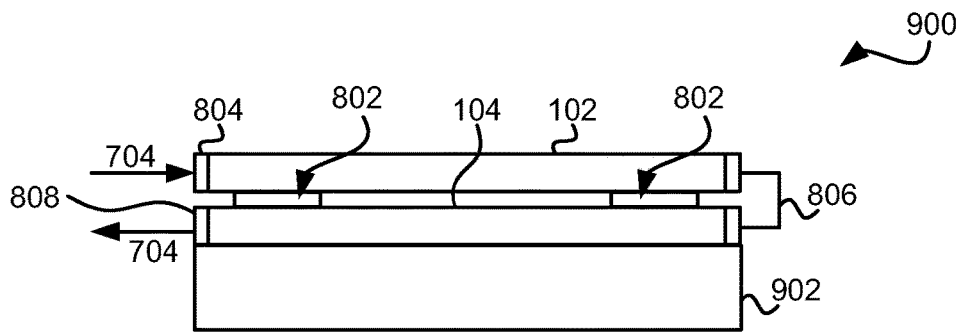
FIG. 9 is a side view of a fuse and resistor in a stacked configuration on a substrate in accordance with one embodiment.

FIG. 9 depicts a fuse and resistor device configuration 900 in accordance with one embodiment. As an option, the present fuse and resistor device configuration 900 may be implemented in conjunction with features from any other embodiment listed herein, such as those described with reference to the other FIGS. Of course, however, such fuse and resistor device configuration 900 and others presented herein may be used in various applications and/or in permutations which may or may not be specifically described in the illustrative embodiments listed herein. Further, the fuse and resistor device configuration presented herein may be used in any desired environment.

FIG. 9 is a side view of a fuse 102 and resistor 104 in a stacked configuration on a substrate 902 in accordance with one embodiment. In this example, the device of FIG. 8 is shown above the substrate 902. According to configuration 900 and/or various other embodiments, the hybrid device may include fuse 102, resistor 104, leads 804, 808 and a substrate 902.

According to various embodiments, the stacking may be at least partially stacked above the substrate or where center portions of each component are about aligned. In further embodiments, the stacking may be where the center portions of each component are not aligned.

Depending on the embodiment, the fuse 102, resistor 104, and/or leads 804 may be readily detachable from the substrate, e.g., in order to replace a damaged fuse 102 and/or resistor 104, in order to replace the existing fuse 102 and/or resistor 104 with a fuse 102 and/or resistor 104 of a differing functionality, etc. In other embodiments, the fuse 102, resistor 104, and/or leads 804 may be permanently affixed to the substrate 902 by design.

Although in configuration 900, resistor 104 is stacked on top of fuse 102, in further embodiments, fuse 102 may alternatively be stacked on top of resistor 104.

Fuse and resistor device configurations 600, 700, 800, 900 may advantageously allow for compactness of the hybrid device described herein. Compactness of the hybrid device described herein may be advantageous as the demand for device compactness continues.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A device, comprising:
a fuse; and
a resistor electrically coupled directly to the fuse in series therewith,
wherein the resistor is positioned after the fuse in an intended direction of current flow therethrough,
wherein the fuse and resistor are in a single package,
wherein a resistance of the resistor is not temperature sensitive,
wherein an electrical path of the device consists of the fuse, the resistor, and an optional conductive path between the fuse and the resistor, wherein the resistor is a variable resistance resistor.

2. The device of claim 1, wherein a power dissipation of the resistor is sufficiently high to ensure that the fuse will open before the resistor becomes overloaded, wherein the fuse is a hot swap fuse, wherein the hot swap fuse is replaceable separately from the resistor.

3. The device of claim 1, wherein the resistor is a plurality of resistors coupled in parallel with one another.

4. The device of claim 1, comprising;
a warning system that is configured to generate a warning,
wherein the warning system of the device has saved therein a calculation for determining a time expected for the fuse to blow as a result of the fuse experiencing a current level greater than a predetermined power rating of the resistor,
wherein the device is configured for direct current application.

5. A device, comprising:
a fuse;
a resistor electrically coupled directly to the fuse in series therewith,
wherein the resistor is positioned after the fuse in an intended direction of current flow therethrough,
wherein the fuse and resistor are in a single package,
wherein the fuse and resistor are physically stacked one atop the other in the single package; and
an electrical insulator extending from a surface of the fuse to a surface of the resistor for separating the fuse from the resistor.

6. The device of claim 5, wherein the fuse and resistor are at least partially off center relative to one another.

7. The device of claim 5, wherein a resistance of the resistor is 1 ohm or less, and further comprising a current source coupled to the fuse for sending current through the fuse in the intended direction of current flow.

8. The device of claim 5, wherein a resistance of the resistor is not temperature sensitive.

9. A hybrid device, comprising:
a fuse; and
a variable resistance resistor electrically coupled in series with the fuse in a single package,
wherein the fuse is a hot swap fuse that is replaceable separately from the resistor,
wherein a maximum resistance of the resistor is 1 ohm or less.

10. The hybrid device of claim 9, wherein a power dissipation of the resistor is sufficiently high to ensure that the fuse will open before the resistor becomes overloaded.

11. The hybrid device of claim 9, wherein the resistor is positioned after the fuse in an intended direction of current flow therethrough.

12. The hybrid device of claim 9, wherein a conductive path of the device consists of the fuse and the resistor, wherein the resistor is electrically coupled directly to the fuse, wherein a resistance of the resistor is 0.5 ohms or less.

13. The hybrid device of claim 12, comprising:
an electrical insulator extending from a surface of the fuse to a surface of the resistor for separating the fuse from the resistor; and
a warning system that is configured to generate a warning,
wherein the warning system of the device has saved therein a calculation for determining a time expected for the fuse to blow as a result of the fuse experiencing a current level greater than a predetermined power rating of the resistor,
wherein the device is configured for direct current application,
wherein the fuse and resistor are physically stacked one atop the other,
wherein the fuse is the only fuse in the device.

14. The hybrid device of claim 12, wherein the device is configured for direct current application.

15. The hybrid device of claim 9, wherein the device is configured for direct current application.

16. The hybrid device of claim 15, wherein the resistor is physically stacked on top of the fuse, wherein the fuse and resistor are stacked at least partially off center so that the fuse and resistor are not aligned.

17. The hybrid device of claim 9, wherein the fuse and resistor are physically stacked one atop the other; and comprising: an electrical insulator extending from a surface of the fuse to a surface of the resistor for separating the fuse from the resistor.

18. The hybrid device of claim 9, wherein a resistance of the resistor is substantially temperature insensitive, wherein the substantially temperature insensitive resistance of the resistor changes by less than 1% during use.

19. The hybrid device of claim 9, wherein a resistance of the resistor changes less than 0.1% during use.

* * * * *